Aug. 17, 1965    A. B. PAGEL    3,200,676
WRENCHES
Filed May 14, 1962    2 Sheets-Sheet 1
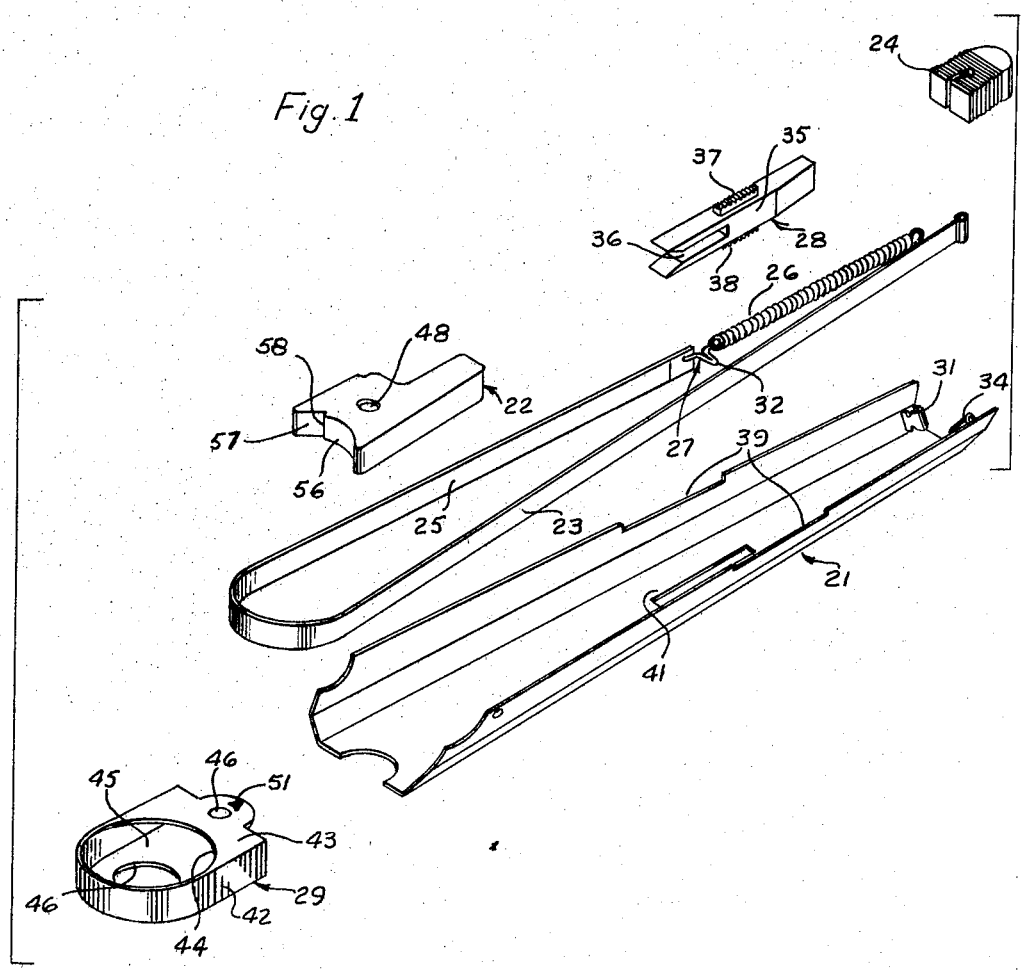
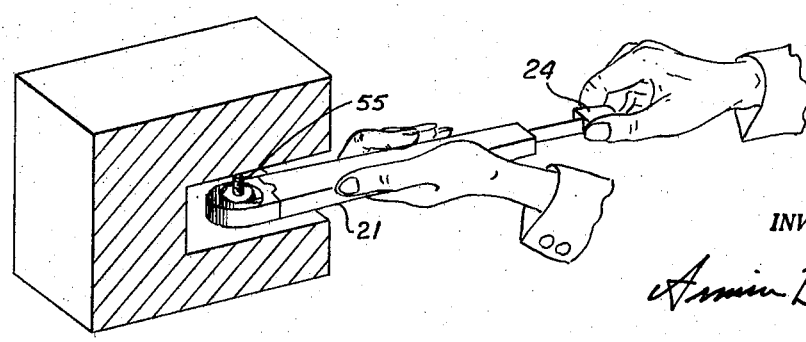
INVENTOR.
Armin B. Pagel Aug. 17, 1965    A. B. PAGEL    3,200,676
WRENCHES
Filed May 14, 1962    2 Sheets-Sheet 2
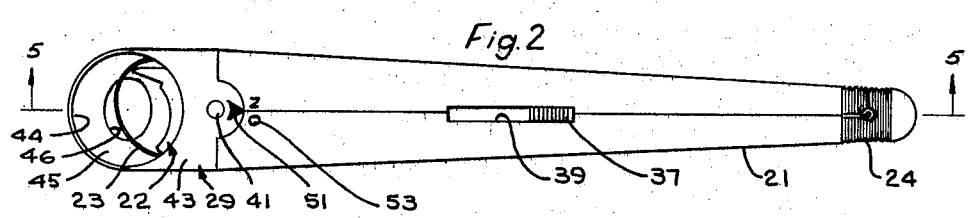
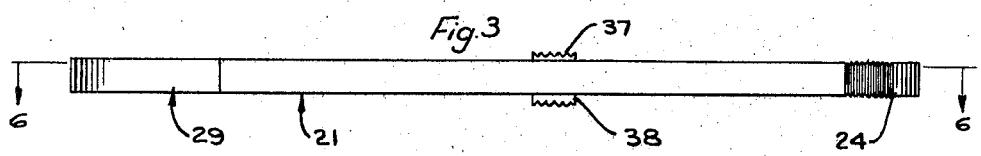
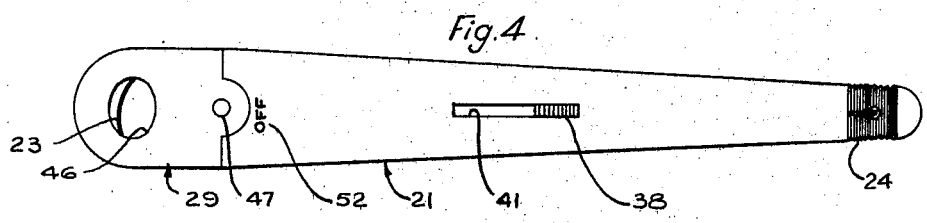
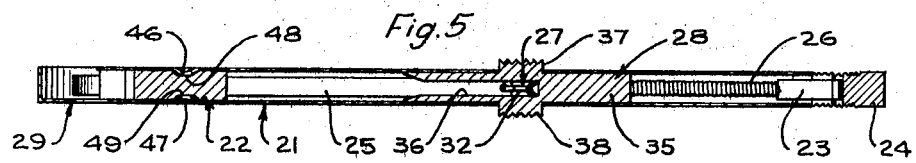
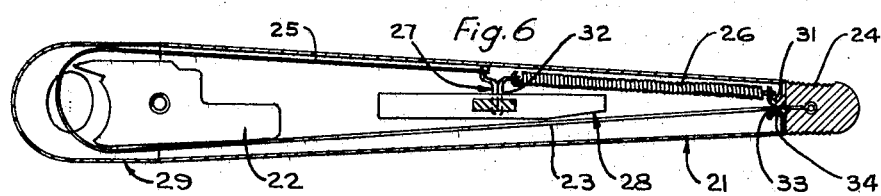
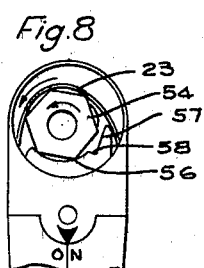
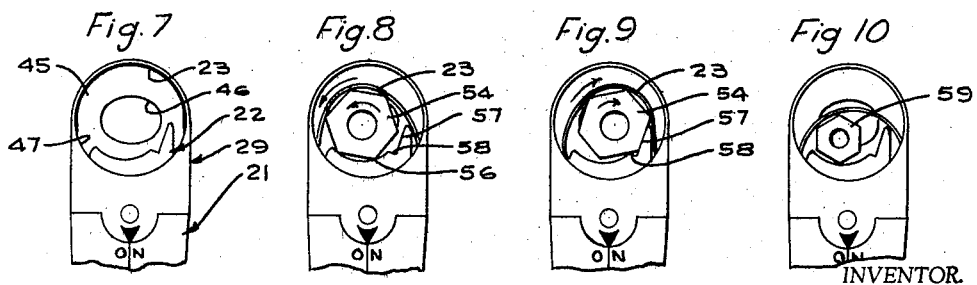
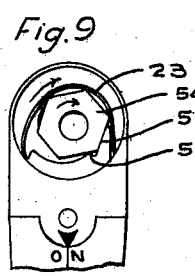
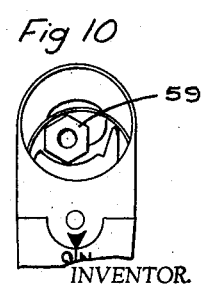
INVENTOR.
Armin B Pagel United States Patent Office 3,200,676
Patented Aug. 17, 1965

3,200,676
WRENCHES
Armin B. Pagel, 821 Arlington Court, Janesville, Wis.
Filed May 14, 1962, Ser. No. 194,639
4 Claims. (Cl. 81—64)

The present invention relates to tools for installing and removing hexagonal nuts and bolts and more specifically to a tool for effecting such installation and removal in locations where space restrictions prevent performing these operations by hand or with conventional types of wrenches.

A common and frustrating problem encountered by mechanics involves the installation or removal of a nut or bolt located in a position which prevents such operations from being performed by hand and which does not allow the use of a tool such as a socket wrench to provide an accessible extension in a direction axial to that of the nut or bolt. While various types of tools have been devised to support and rotate a nut or bolt in such an inaccessible position for accomplishing the installation or removal thereof, such devices have generally been of limited usefulness for one or more reasons including complexity and the resulting cost of the tool, the usefulness of the tool only with nuts and bolts of a particular size, and the size of the head portion of the tool which limits its usefulness in extremely cramped locations.

Accordingly, a principal object of the present invention is to simplify the construction of a tool adapted to support and rotate a nut or bolt at a point remote from the operator's hands. Another object of the invention is to reduce the size of that portion of such a tool that supports the nut or bolt. Another object of the invention is to provide a simple and effective means for reversing the direction in which a nut or bolt is rotated by the tool in order that the same tool may be used either for removing or installing such fasteners having either right or left hand threads. Yet another object of the invention is to enable a single tool to be used with nuts or bolts of more than one size.

These and other important objects of the invention will be apparent from the following description, reference being made to the accompanying drawings in which:

FIG. 1 is an exploded perspective view of the tool according to the preferred embodiment of the invention;

FIG. 2 is a top plan view of the tool;

FIG. 3 is a side elevation view of the tool shown in FIG. 1;

FIG. 4 is a bottom plan view of the tool shown in FIG. 1;

FIG. 5 is a sectional view taken along the lines 5—5 of FIG. 2;

FIG. 6 is a sectional view taken along the lines 6—6 of FIG. 3;

FIG. 7 is a partial plan view of the head portion of the tool in condition for receiving a nut or bolt;

FIG. 8 is a partial plan view of the head portion of the tool with a nut located therein being rotated in the direction in which it is threaded onto a mating bolt or stud.

FIG. 9 is a partial plan view of the head portion of the tool showing the means by which the rotation of the nut in the opposite direction from that shown in FIG. 8 is restrained;

FIG. 10 is a partial plan view of the head portion of the tool showing a smaller nut accommodated therein; and FIG. 11 is a perspective drawing showing the manner in which the tool may be employed to install a nut in an inaccessible location.

Referring now to the drawings, and more particularly to FIGS. 1 and 6, the preferred embodiment of the tool comprises a handle 21, a support member 22, a flexible metal band 23 provided with a pull knob 24 and with a friction surface 25, a coil spring 26 attached to the flexible metal band by a link member 27, a slide member 28, and a head member 29. In the illustrated embodiment, the handle is formed of sheet metal with a solid metal support member 22 attached thereto by conventional means such as soldering. Alternatively, the handle and support member might be formed of one or more molded plastic components with the portion of the support member that is subject to wear preferably being provided with a metal facing. Spring 26 is anchored at one end to the handle by an ear 31, or by other analogous means and is connected at its other end to the flexible band 23 by means of link member 27, which may be formed of wire and which includes an inwardly projecting slide engaging portion 32. The flexible band 23 is looped about the support member as is best shown in FIG. 6, with the longer end thereof extending through a slot 33 defined by ear 31 and a corresponding ear 34 opposite thereto at the end of the handle, and is attached to pull knob 24 by any appropriate means.

Slide 28 comprises a body portion 35 provided with a slot 36 and with opposite serrated operating lugs 37 and 38 which project through corresponding slots 39 and 41 in the handle, thereby supporting the slide for limited movement along the axis of the tool. As shown in FIGS. 5 and 6, the slide engaging portion 32 of link member 27 is received by slot 36. This construction enables the body member 35 to cover slots 39 and 41 at all times to prevent the entrance of foreign material into the tool through the slots. With the slide in the rearward position illustrated in the drawings, band 23 is under a slight spring tension and assumes the appropriate position relative to support member 22 shown in FIGS. 2 and 6 due to the slight inherent springiness of the band.

Head member 29, which may likewise be made of either metal or plastic, comprises a U-shaped wall portion 42 between a wall section 43 provided with a circular opening 44 defined in part by the arcuate portion of wall portion 42, and a second wall section 45 provided with a smaller opening 46. The head member is removably and reversibly attachable to the handle by the engagement of oppositely disposed detents 46 and 47 with corresponding indentations 48 and 49 in the support member 22, as shown in FIG. 5.

To utilize the tool for installing a nut on a conventional stud or bolt having right hand threads, the head is attached to the handle as shown in the drawings so that it bears the illustrated relation to the other elements of the tool. To facilitate this proper orientation of the head to the handle, the head may be provided wtih a symbol 51 on wall section 43 and with "off" and "on" markings 52 and 53 respectively, so that the condition of the tool is readily indicated by the marking with which the symbol is aligned.

To load a nut into the head portion of the tool, slide member 28 is pushed toward the head, thereby engaging portion 32 of link 27 and releasing the spring tension on band 23, whereby the band is caused to assume the position shown in FIG. 7. The nut, as shown at 54, is then positioned against wall portion 45 within the head and the slide is released causing the band to engage the nut and urge it toward the support member 22 as shown in FIG. 8. As shown at 25, the inside surface of band 23 is provided with a friction surface which extends between a point adjacent the end thereof attached to link 27 and a point beyond the support member. This friction coating may, for example, comprise a fabric or plastic web bonded to the band, or might be formed by texturing the surface of the band itself. Alternatively, the band itself might be made of fabric or plastic material.

To rotate the nut for threading it onto the mating fastener element, the operator holds the tool in one hand with the surface of the nut adjacent opening 44 in aligned contact with the bolt or stud 55, and with the other hand alternately moves knob 24 away from and toward the handle as in the manner shown in FIG. 11.

As the knob is pulled away from the handle, band 23, under the tension of spring 26, moves through a substantially U-shaped path about the support member in engagement with the nut. Due to the lesser friction between the corners of the nut and the arcuate surface 56 of the support member as compared to the friction between the nut and the friction surface 25 of band 23, a rotary motion is thereby imparted to the nut in the direction shown in FIG. 8, i.e., in a clockwise direction relative to the stud or bolt or in a counterclockwise direction as viewed in FIG. 8. As the nut is run onto the bolt, the end thereof projects through opening 46, which is of sufficient size to prevent contact of the bolt with wall portion 45, against which the nut is axially supported.

As the knob is moved back toward the handle, the band is drawn back to its initial position by spring 26. If the knob is returned quickly, there is substantially less tension on the band than during the previous operation. Therefore, the tendency of the band to rotate the nut is substantially reduced. Furthermore, if the knob is thus returned quickly or is simply released, the inertia of the nut itself is sufficient to prevent its being rotated to the same extent as during the preceding slower opposite movement of the band. However, to provide a positive means for preventing, or at least substantially preventing the rotation of the nut as the band returns to its initial position under the influence of the spring, the support member may be provided with a flat surface 57 and a detent notch 58, or with equivalent support surface structure. With this structure, the return movement of the band tends to rotate the nut in the direction shown in FIG. 9, whereby it rolls into the position shown, in which further rotation is blocked by the engagement of a corner of the nut with the detent notch and by virtue of the fact that a flat surface of the nut is in contact with a flat support surface over which the nut cannot freely roll. Although the drawings depict the nut as moving laterally relative to the tool, this actually occurs only initially, since the center of rotation of the nut is fixed once the nut is engaged with the bolt, whereupon the same relative motion is achieved by the lateral movement of the head portion end of the tool.

By repeating the operations just described, the nut may be run onto the bolt for any distance until it is seated or otherwise stopped by a discontinuity in the threaded portion of the bolt, after which the final tightening operation is carried out by means of a conventional wrench.

To use the same tool for removing a nut that has previously been loosened by means of a conventional wrench, the head portion of the tool is reversed so that symbol 51 is aligned with the "off" mark 52, thereby enabling the tool to be used in an inverted position relative to the bolt or stud. With the slide pushed forward, the head portion is then slid over the bolt so that the nut is received in the same manner previously described, whereupon it may be readily threaded off the bolt by the same reciprocal movement of the knob. After the nut has been removed, it remains firmly held in the head until it is released by moving the slide member forward.

It is of course apparent that while the foregoing description relates to the installation and removal of a nut, the same tool is equally useful in installing or removing a hexagonal head bolt. As shown in FIG. 10, which illustrates a smaller nut 59 received in the head portion of the tool, various sizes of nuts or bolts may be installed or removed by the same tool.

Although the illustrated embodiment comprises a reciprocable band, it would also be possible to embody the same mode of operation in a tool having an endless band or to modify the construction so that the band engages and supports the nut about a greater portion of its periphery than in the illustrated version. Similarly, means other than those described might be employed to reverse the direction of rotation. If desired, the tool may also be provided with either an integral or removable pistol grip type of attachment or with equivalent means to facilitate one-handed operation thereof. Since these and other modifications are within the scope and spirit of the invention, the foregoing description should be considered as illustrative only and not as limiting the invention which is defined by the following claims.

I claim:

1. A tool comprising an elongate handle member, support means defining a support surface adjacent one end of said handle member and facing away from the opposite end thereof, an elongate flexible band supported by said handle for reciprocable longitudinal movement through a substantially U-shaped path around said support means with the curved intermediate portion of said band opposite said support surface and with the end portions of said band extending along said handle in generally parallel relation, spring means connecting one end of said band to said handle for biasing said one end away from said support means, actuating means accessible at a location remote from said support means for moving said band along said path against the influence of said spring means, and adjusting means independent of said actuating means for moving the end of said band connected to said spring means toward said support means against the influence of said spring.

2. A tool for supporting and rotating a polygonal fastener, said tool comprising an elongate handle member, support means defining a support surface adjacent one end of said handle member and facing away from the opposite end thereof, an elongate flexible band supported by said handle for reciprocable longitudinal movement through a substantially U-shaped path around said support means with the curved intermediate portion of said band opposite said support surface and with the end portions of said band extending along said handle in generally parallel relation, spring means connecting one end of said band to said handle for biasing said one end away from said support means, actuating means accessible at a location remote from said support means for moving said band along said path against the influence of said spring means, said support surface including a curved surface area defining a generally concavely curved plane facing the inner surface of the curved intermediate portion of said band, whereby said fastener when positioned between said support surface and said curved intermediate portion of said band is urged laterally by said band into lateral engagement with said support surface to rotatably support said fastener against said surface as rotational movement is transmitted to said fastener by the longitudinal movement of said band along said path, and means defining a shoulder on said support surface adjacent said curved surface area, said shoulder being adapted to engage an apex of said fastener in ratchet-like fashion to block the rotation of said fastener in one direction while allowing said fastener to rotate freely against said support surface in the opposite direction.

3. A tool for supporting and rotating a polygonal fastener, said tool comprising an elongate handle member, support means defining a support surface adjacent one end of said handle member and facing away from the opposite end thereof, an elongate flexible band supported by said handle for reciprocable longitudinal movement through a substantially U-shaped path around said support means with the curved intermediate portion of said band opposite said support surface and with the end portions of said band extending along said handle in generally parallel relation, spring means connecting one end of said band to said handle for biasing said one end away from said support means, actuating means accessible at a location remote from said support means for moving said band along said path against the influence of said spring means, said support surface including a curved surface area defining a generally concavely curved plane facing the inner surface of the curved intermediate portion of said band, whereby said fastener when positioned between said support surface and said curved intermediate portion of said band is urged laterally by said band into lateral engagement with said support surface to rotatably support said fastener against said surface as rotational movement is transmitted to said fastener by the longitudinal movement of said band along said path, means defining a shoulder on said support surface adjacent said curved surface area, said shoulder being adapted to engage an apex of said fastener in ratchet-like fashion to block the rotation of said fastener in one direction while allowing said fastener to rotate freely against said support surface in the opposite direction, said tool including wall means defining a flat surface adjacent one edge of said curved surface area and said curved intermediate portion of said band, said flat surface being in substantially parallel relation to the adjacent portion of said band and in substantially normal relation to the curved plane defined by said curved surface area.

4. In a tool for supporting and rotating a hexagonal threaded fastener, the combination comprising: a curved fastener supporting member providing a bearing surface laterally adjacent said fastener for supporting said fastener for rotation relative to said member by the lateral engagement of no more than three adjacent apexes thereof against said surface, an elongate flexible band longitudinally movable throughout its length along a path in which a portion of said band is curved about said fastener supporting member in alignment therewith and laterally adjacent the side of said fastener opposite said bearing surface, means remote from said member for moving said band longitudinally along said path, and resilient means for longitudinally tensioning said band throughout its movement along said path to urge the curved portion of said band into lateral frictional engagement with said fastener to laterally retain said fastener between said band and said bearing surface in rotatable supported engagement against said bearing surface while rotational movement is imparted to said fastener by the moving band, said resilient means also serving to limit the tension of said band during its movement whereby the lateral force exerted on the fastener by the band is insufficient to prevent rotation of the fastener against said bearing surface by said band.

References Cited by the Examiner

UNITED STATES PATENTS

| | | | |
|---|---|---|---|
| 1,726,862 | 9/29 | Schustarich | 81—64 X |
| 1,903,514 | 4/33 | Merriman et al. | 81—57 |
| 2,303,579 | 12/42 | Ramoneda | 81—64 |
| 2,357,595 | 9/44 | McPherson. | |
| 2,603,998 | 7/52 | Schwartz | 81—57 |
| 2,690,689 | 10/54 | Batcha | 81—58.1 X |
| 2,733,745 | 2/56 | Norwood | 81—58.1 X |
| 3,124,983 | 3/64 | Emerzian | 81—57 X |

WILLIAM FELDMAN, *Primary Examiner.*